(12) United States Patent
Chang

(10) Patent No.: US 6,282,580 B1
(45) Date of Patent: Aug. 28, 2001

(54) BRIDGE PROVIDING COMMUNICATION BETWEEN DIFFERENT IMPLEMENTATIONS OF OBJECT REQUEST BROKERS

(75) Inventor: April S. Chang, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/678,422

(22) Filed: Jul. 2, 1996

(51) Int. Cl.[7] .................................. G06F 9/00; G06F 9/46
(52) U.S. Cl. ........................................................... 709/316
(58) Field of Search ........................... 395/683, 680, 395/701, 185.1; 709/300–305, 310–332; 714/48

(56) References Cited

U.S. PATENT DOCUMENTS

| | | | |
|---|---|---|---|
| 5,187,787 | * 2/1993 | Skeen et al. | 395/680 |
| 5,539,909 | * 7/1996 | Tanaka et al. | 395/683 |
| 5,613,148 | * 3/1997 | Bezviner et al. | 395/701 |
| 5,692,183 | * 11/1997 | Hapner et al. | 395/701 |
| 5,708,828 | * 1/1998 | Coleman | 395/785 |
| 5,724,503 | * 3/1998 | Kleinman et al. | 395/185.1 |
| 5,732,270 | * 3/1998 | Foody et al. | 709/303 |
| 5,778,369 | * 7/1998 | Pascoe et al. | 707/100 |

OTHER PUBLICATIONS

The Common Object Request Broker: Architecture and Specification, Revision 2.0, Jul. 1995.*
OMG, ORB 2.0 RFP Submission: ORB Interoperability, OMG TC document 94.3.1, pp. 1–40, Mar. 7, 1994.*
Brando, Thomas; Interoperability & the CORBA Specification; MITRE Document MP 95B–58; pp. 1–13; Feb. 1995.*
Object–Orientation FAQ: HP–ORB & HP Distributed Smalltalk; pp. 1–3; Sep. 27, 1993.*
Common Object Request Broker: Architecture & Specification, Revision 2.0; Chaps. 2, 7, 9–12; Jul. 1995.*

* cited by examiner

*Primary Examiner*—Majid Banankhah
*Assistant Examiner*—P Caldwell
(74) *Attorney, Agent, or Firm*—Beyer Weaver & Thomas

(57) ABSTRACT

Systems and methods for providing communication between different implementations of object request brokers are provided. A bridge including a proxy object allows communication between the object request brokers. The proxy object within the bridge stores the server object reference in its reference data. The proxy object translates messages (e.g., requests and responses/exceptions) to the transfer protocol of the server object and redirects these messages according to the server object reference stored in the proxy object's reference data.

28 Claims, 10 Drawing Sheets

One interface for each object type

Identical interface for all ORBs

There may be multiple object adapters

BRIDGE PROVIDING COMMUNICATION BETWEEN DIFFERENT IMPLEMENTATIONS OF OBJECT REQUEST BROKERS

BACKGROUND OF THE INVENTION

The present invention is related to object-oriented computer systems and, more particularly, to a bridge allowing communication between different implementations of object request brokers.

As individual computer systems increasingly become more powerful and complex, the integration of these heterogeneous computer systems becomes a very desirable yet difficult task. Users' expectations for interoperability have increased dramatically due to the availability of highly interoperable platforms such as UNIX, Microsoft Windows and Apple Macintosh. Unfortunately, vendor-specific solutions for integrating heterogeneous computer systems have generally been unsatisfactory. This is especially true because vendor-specific solutions require upgrades to take into account new product releases.

The Object Management Group (OMG) has promulgated standards for nonvendor-specific solutions for heterogeneous systems integration. At the heart of OMG's standard is the Common Object Request Broker Architecture (CORBA). CORBA is a distributed environment defined using object-oriented concepts to hide all differences between programming languages, operating systems, hardware platforms, and object location. This interoperability is achieved through well-defined interface specifications at the application level.

Well-defined protocols exist for allowing systems to communicate by agreeing to certain standards that will be used. The Open Systems Interconnection (OSI) seven layer model is possibly the most widespread of these protocols. The lowest layer, the Physical layer, describes how the physical network is accessed. The Data Link layer provides reliable transmission across a physical link. The Network layer deals with connection establishment and routing. The Transport layer provides reliable end-to-end transmission. The Session layer is concerned with connection control. The Presentation layer deals with data syntax and transparency to the applications. Lastly, the upper layer, the Application layer, describes end-user functionality. Conceptually, CORBA resides in the Application layer.

A central component of CORBA is the Object Request Broker (ORB) which is the infrastructure for providing transparent distributed communication across heterogeneous systems. The CORBA specification describes all the standard interfaces for ORBs. The Basic Object Adapter (BOA) is an initial set of ORB interfaces for object implementations.

CORBA is a peer-to-peer distributed computer facility where all applications are objects. Objects can alternate between being a client and a server, where a client object is defined as being the originator of an object invocation and a server object is defined as being the recipient of an object invocation. Server objects are also referred to as object implementations. Typically, objects play both roles at one time or another.

CORBA provides two mechanisms with or through which applications may communicate: static interfaces and dynamic interfaces. In static interfaces, the parameters are defined at compile-time whereas in dynamic interfaces, the parameters are defined at run-time.

Static interfaces include a stub and a skeleton. The client object links to the stub so that from the client's perspective, the stub acts like a local function call. Transparently, the stub provides an interface to the ORB that encodes and decodes the specified operation's parameters into communication formats suitable for transmission. The skeleton is the corresponding server-side implementation of the interface. When the server object completes processing of the request, the skeleton and stub return the results to the client, along with any exceptions that are generated by either the server or the ORB.

Dynamic interfaces are an alternative to compiled static interfaces. Dynamic interfaces include a Dynamic Invocation Interface (DII) and a Dynamic Skeleton Interface (DSI). The DII is a generic facility for invoking any operation with a run-time-defined parameter list. A run-time interface description of the operation signature specifying the parameter list is retrieved during run-time. Thus, a request can be constructed to previously unknown operation or object type. The DSI is the corresponding server-side implementation of the interface. Use of the dynamic interface instead of the static interface is transparent to object implementation.

Current CORBA ORB products support software integration across multiple platforms. ORB implementations may be generic across multiple platforms or platform-specific. Platform-specific ORB implementations offer many advantages including more efficient implementation resulting from closer ties to the operation system. As an example, Sun Microsystems' NEO provides shared services extensions to the Solaris operating system. NEO supports standards such as OMG's CORBA specifications.

Although platform-specific implementations of CORBA offer many advantages, there is a need for more efficient systems and methods for providing communication between different implementations of ORBs.

SUMMARY OF THE INVENTION

Embodiments of the present invention provide innovative systems and methods for providing communication between different implementations of object request brokers. A bridge including a proxy object allows communication between the object request brokers. The proxy object within the bridge stores the server object reference in its reference data. The proxy object translates messages (e.g., requests and responses/exceptions) to the transfer protocol of the server object and redirects these messages according to the server object reference stored in the proxy object's reference data. Thus, an efficient mechanism for providing communication between different implementations of object request brokers is achieved.

In one embodiment, the present invention provides a method of providing communication between a first object request broker utilizing a first transport protocol and a second object request broker utilizing a second transport protocol, comprising the steps of: storing within the reference data of a proxy object a reference to a server object; the proxy object receiving a request in the first transport protocol from a client object on the first object request broker; the proxy object translating the request to the second transport protocol; and the proxy object sending the translated request to the server object specified by the stored reference.

In another embodiment, the present invention provides a system for providing communication between different implementations of object request brokers, comprising: a first object request broker utilizing a first transport protocol; a client object on the first object request broker; a second object request broker utilizing a second transport protocol, the first and second transport protocols being different; a server object on the second object request broker; and a proxy object that translates a request in the first transport protocol from the client object to the second transport protocol and sends the translated request to the server object specified by a reference to the server object stored in the reference data of the proxy object.

Other features and advantages of the present invention will become apparent upon a perusal of the remaining portions of the specification and drawings.

DETAILED DESCRIPTION OF PREFERRED EMBODIMENTS

In the description that follows, embodiments of the present invention will be described in reference to NEO ORBs on a Sun workstation running under the Solaris operating system. The present invention, however, is not limited to any particular ORB implementation, computer architecture or operating system. Additionally, the following describes communication between two ORBs, but communication among multiple ORBs may be accomplished by an extension of the principles described herein. Therefore, the description the embodiments that follow is for purposes of illustration and not limitation.

Figure 1:
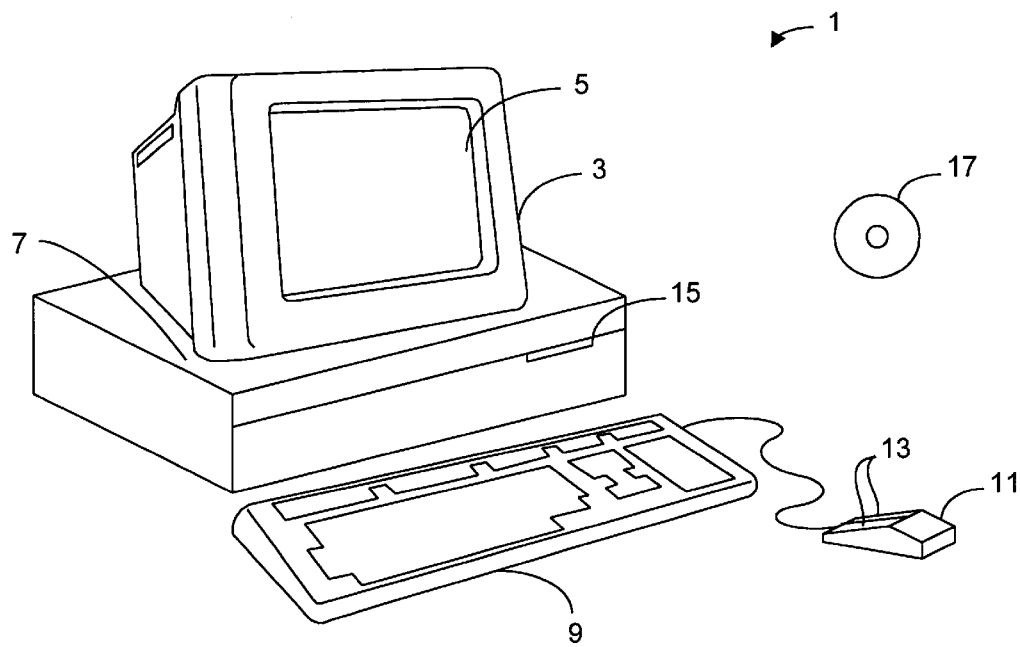
FIG. 1 illustrates an example of a computer system used to execute the software of an embodiment of the present invention.

FIG. 1 illustrates an example of a computer system used to execute the software of an embodiment of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15, a system memory and a hard drive (see FIG. 2) which may be utilized to store and retrieve software programs incorporating code that implements the present invention, data for use with the present invention, and the like. Although a CD-ROM 17 is shown as an exemplary computer readable storage medium, other computer readable storage media including floppy disks, tape, flash memory, system memory, and hard drives may be utilized. Cabinet 7 also houses familiar computer components (not shown) such as a central processor, system memory, hard disk, and the like.

Figure 2:
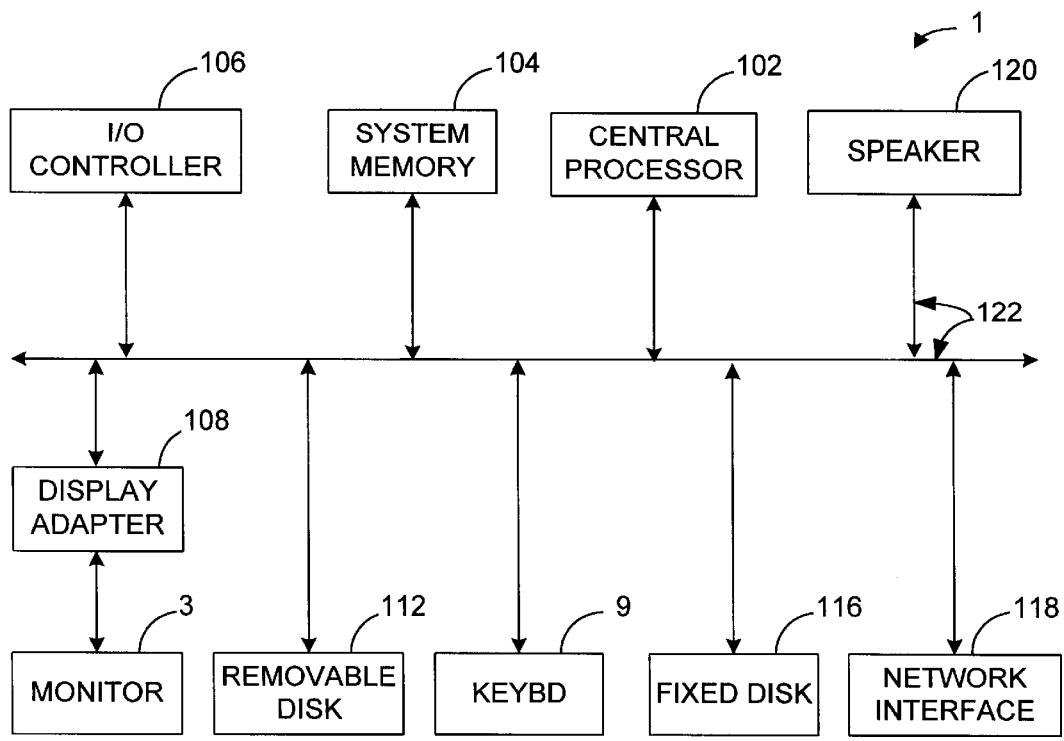
FIG. 2 shows a system block diagram of a typical computer system used to execute the software of an embodiment of the present invention.

FIG. 2 shows a system block diagram of computer system 1 used to execute the software of an embodiment of the present invention. As in FIG. 1, computer system 1 includes monitor 3 and keyboard 9. Computer system 1 further includes subsystems such as a central processor 102, system memory 104, I/O controller 106, display adapter 108, removable disk 112 (e.g., CD-ROM drive), fixed disk 116 (e.g., hard drive), network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
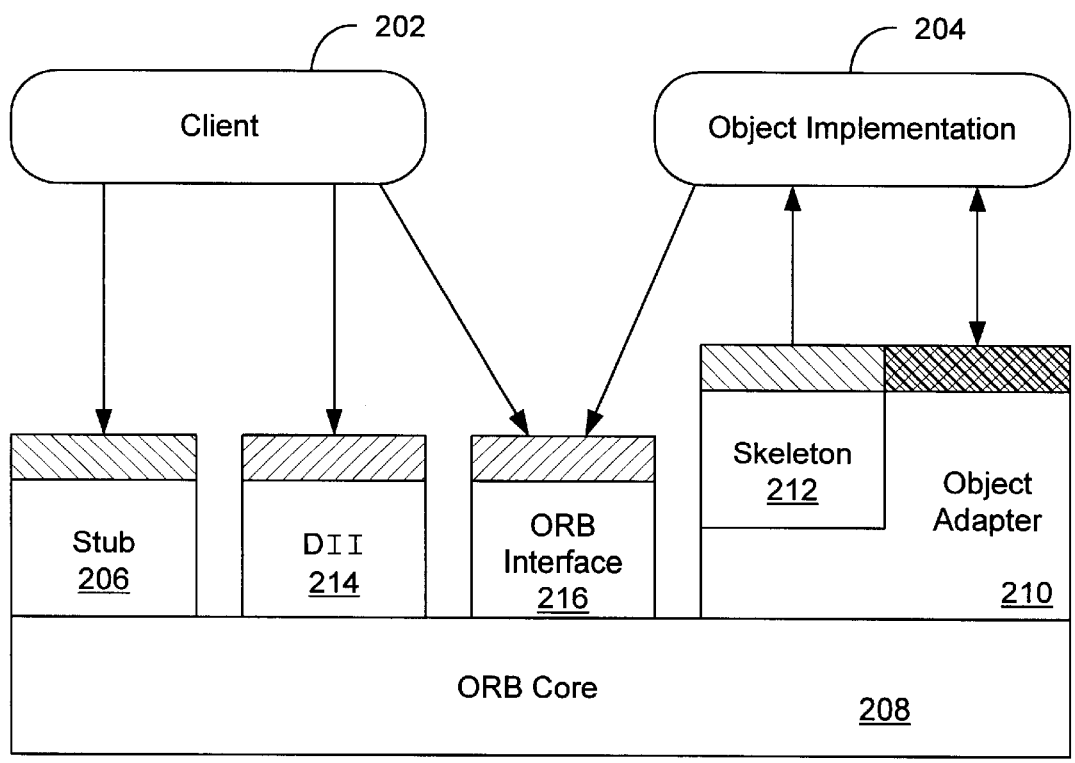
FIG. 3 is a block diagram of the interfaces between CORBA objects.
Figure 3:
Figure 3:
Figure 3:

FIG. 3 is a block diagram of the static and dynamic interfaces between objects in CORBA. A client object 202 makes requests to an object implementation 204 (also called a "server object" as it services client requests). The terms client and server are relative terms. A client may be a client with respect to a specific request and a server with respect to another request. Consequently, these labels will vary according to the circumstances.

A client may also make a request utilizing a dynamic interface by calling a DII 214. The DII provides an interface to ORB core 208 that encodes and decodes the specified operation's parameters into communication formats suitable for transmission over the transfer medium. The DII is dynamic because the parameter list is defined at run-time.

After a request is encoded and transmitted over the transfer medium, the request is decoded and passed to object adapter 210. If the specified object implementation utilizes a dynamic interface, skeleton 212 (DSI in this case) provides a callback to a function implementation for the request. The client and server object may also interact directly with the ORB core through an ORB interface 216.

It should be noted that the format of the request is the same over the transfer medium regardless of whether a static or dynamic interface is utilized. In a preferred embodiment, the client and server objects utilize a dynamic interface.

A general protocol for communicating between ORBs is the Internet Interoperability Protocol (IIOP). IIOP is based on Transmission Control Protocol/Internet Protocol (TCP/IP) which is the protocol of the Internet. Additionally, IIOP is specifically directed to ORB-to-ORB interoperability. In the description that follows, ORBs will be described as utilizing IIOP to communicate. However, the use of this protocol is for illustrative purposes and other protocols may be utilized with the present invention.

Figure 4:
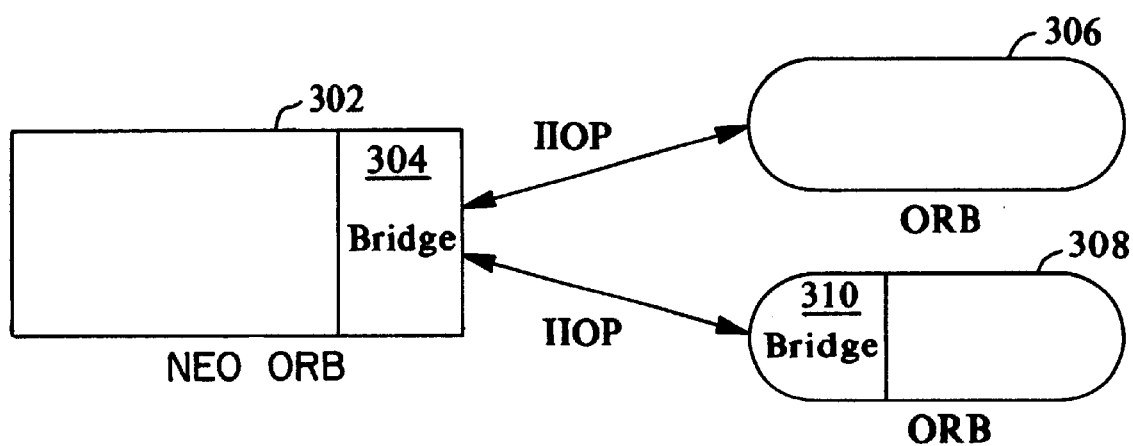
FIG. 4 is a block diagram of a NEO bridge connecting to two different implementations of ORBs.

FIG. 4 is a block diagram of a NEO bridge connecting two different implementations of ORBs. By different implementations (or types) of ORBs, it is meant that the ORBs utilize different transport protocols. A NEO ORB 302 includes a bridge 304 which provides communication with different implementations of ORBs.

An ORB 306 utilizes IIOP as its transport protocol which is a different transport protocol utilized by NEO ORBs, which utilize Distributed Object Management Facility (DOMF). Bridge 304 allows NEO ORB 302 to communicate with ORB 306 utilizing IIOP. Although the bridge is shown in the NEO ORB, the bridge may alternatively be in ORB 306. In either case, the bridge provides bidirectional communication between the different implementations of ORBs.

Also in FIG. 4, an ORB 308 includes a bridge 310. ORB 308 uses a transport protocol other than IIOP. In this instance, bridges 304 and 310 provide communication between ORBs 302 and 308 utilizing an intermediate transport protocol of IIOP. Thus, two bridges provide full interoperability between NEO ORB 302 and ORB 308.

Figure 5:
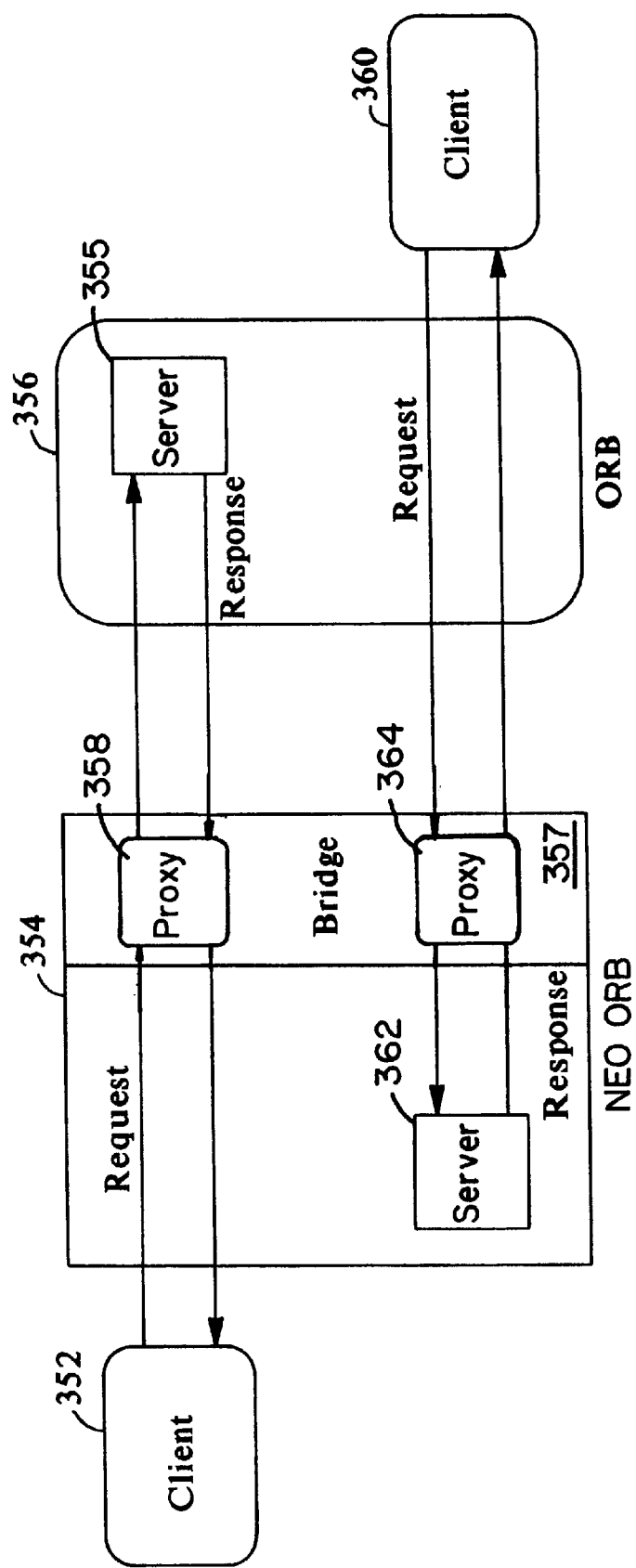
FIG. 5 shows that the bridges of embodiments of the present invention provide bidirectional communication between ORBs.

FIG. 5 shows that the bridges of embodiments of the present invention provide bidirectional communication between different implementations of ORBs. In order to achieve full interoperability, a bridge should allow both a client object on a NEO ORB to invoke a server object on another ORB and a client object on another ORB to invoke a server object on the NEO ORB. Typically, the bridge is hosted atop some ORB (e.g., the NEO ORB).

As shown, a client 352 on a NEO ORB 354 may request to invoke a server 355 on an ORB 356. The client makes a request through the NEO ORB to a bridge 357 which resides on the NEO ORB. The bridge is an application on the ORB that includes a proxy object 358. By proxy object, it is meant an object that translates and redirects requests to a server object. Thus, the proxy object translates the request and sends the request to server 355. The server sends a response (or exception) back to the proxy object which translates the response before sending the response to the client through the NEO ORB.

Client 352 utilizes a local object reference for the proxy object because the client and proxy are on the same ORB. However, the server is on a different ORB so the proxy object utilizes a nonlocal or foreign object reference for the server. In order to more efficiently process the translation of the local object reference of the proxy to the nonlocal object reference of the server, the proxy object stores within its reference data the nonlocal object reference of the server.

The reference data is a storage space within many objects. For example, in Basic Object Adapter (BOA) objects, the reference data space is 1 K bytes. Thus, the nonlocal (or local as discussed in the following paragraphs) object reference for the server may be stored in the reference data of the proxy object. In a preferred embodiment, the object references for the server are stored as strings.

Additionally, a nonlocal client object may request to invoke a local server object. As shown in FIG. 5, a client 360 in ORB 356 may request to invoke a server 362 on NEO ORB 354. The client makes a request to a proxy object 364 in the bridge. The proxy object translates the request before it is sent to the server through the NEO ORB. The server sends a response (or exception) back through the NEO ORB to the proxy object. The proxy object translates the response and sends it to the client through the ORB on which it resides. The proxy object stores the local object reference of the server in the reference data of the proxy object.

Figure 6:
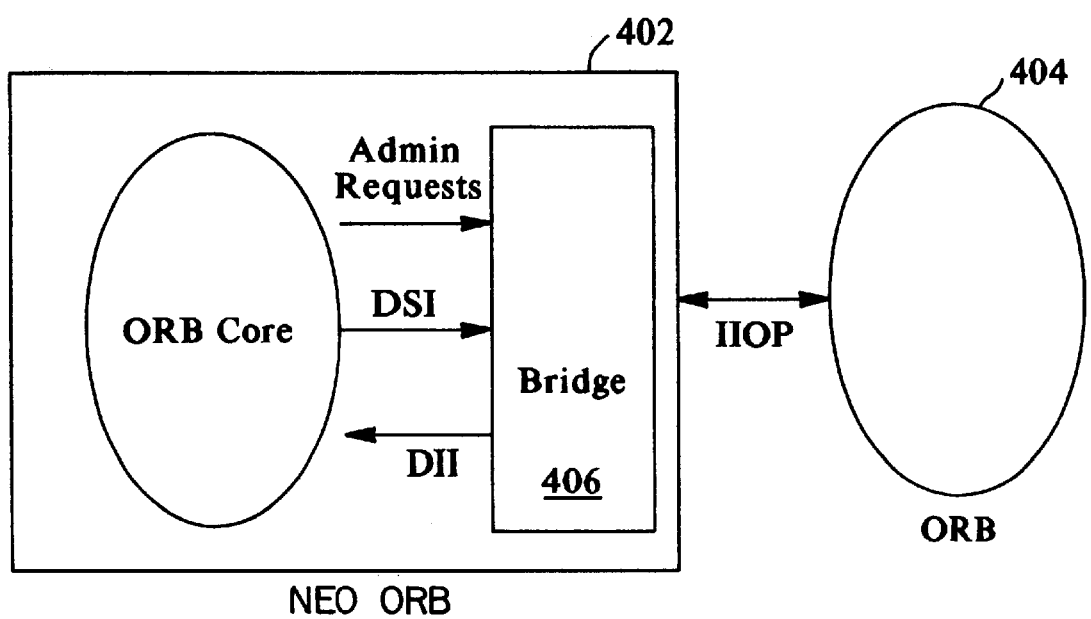
FIG. 6 shows the high level architecture of a bridge.

FIG. 6 shows the high level architecture of a bridge. In a preferred embodiment, the bridge receives requests from two interfaces: DOMF and IIOP. Communication between the bridge and NEO objects utilizes the DOMF transfer protocol (e.g., including DII and DSI). Communication between the bridge and an object on other implementations of ORBs utilizes the IIOP transfer protocol. For example, a request from a client on a NEO ORB 402 to a server on another ORB 404 is sent to a bridge 406 via DSI DOMF. The bridge translates the DSI request to an DII IIOP request. The response/exception is then received by the bridge via DII and the bridge translates it back to a DSI DOMF response/exception.

Also, a request from a client on ORB 404 to a server on NEO ORB 402 is sent to the bridge via DSI IIOP. The bridge translates the DSI request to a DII DOMF request. The response/exception is then received by the bridge via DII and the bridge translates it back to a DSI IIOP response/exception.

The IIOP transfer protocol may be implemented in the bridge in numerous ways including embedding IIOP in the bridge itself (thus, the NEO ORB core does not need to change) or modifying the host ORB to provide dual transport stacks of the DOMF and IIOP transfer protocols. The first approach may be preferable as it is believed to be more efficient and portable.

Figure 7:
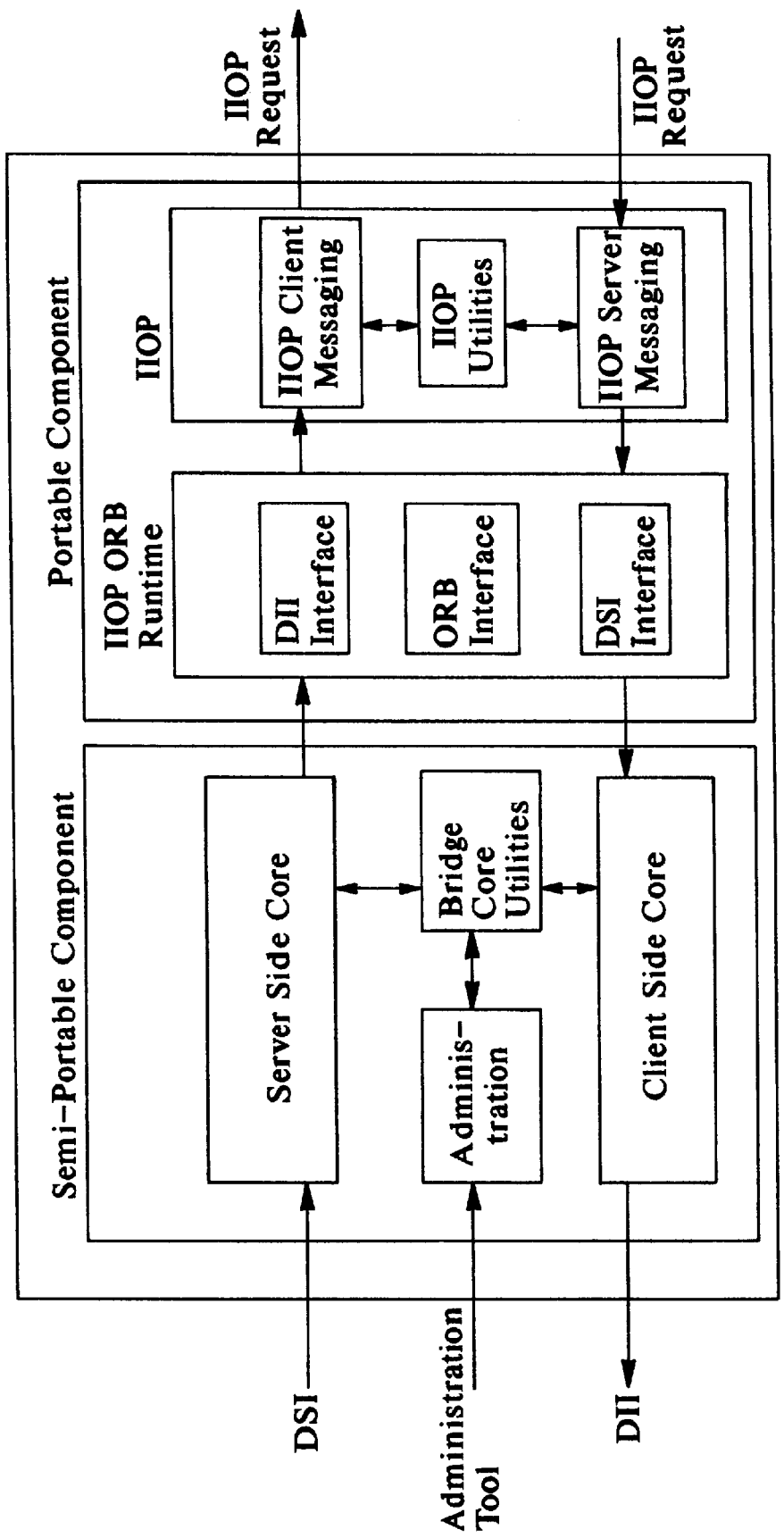
FIG. 7 shows components inside an embodiment of the bridge.

FIG. 7 shows components inside an embodiment of the NEO ORB bridge. In a preferred embodiment, the bridge includes two main parts: 1) the IIOP implementation that contains the IIOP transfer protocol (with part of the ORB interface) and 2) the bridge core that contains the code for translating DOMF requests/responses to IIOP requests/responses (and vice versa). The first part is portable across several UNIX platforms. The second part is not necessarily portable since it interfaces with DOMF which may not be available in every ORB implementation.

The bridge serves as the connecting entity between two ORBs, therefore a bridge is preferably automatically started after a machine is rebooted. A bridge may be implemented as a DOMF self-starting (persistent) server.

Figure 8A:
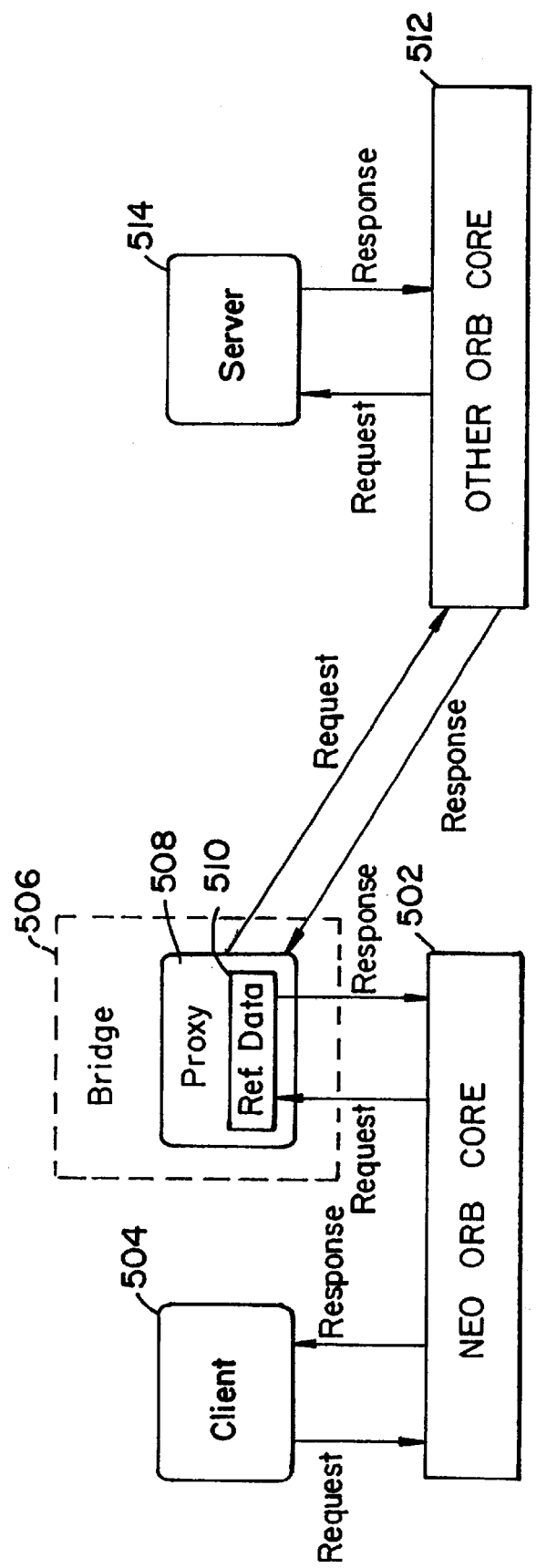
FIG. 8A shows a block diagram of a NEO client object invoking a server object on another ORB.

FIG. 8A shows a block diagram of a NEO client invoking an object on another ORB. A NEO ORB 502 includes a client 504 and a bridge 506. The bridge includes a proxy object 508 which has a storage space of reference data 510. Another ORB 512 includes a server 514. ORB 514 is a different implementation of NEO ORB 502 as it does not utilize the same transfer protocol.

If the client desires to invoke the server, the client sends a request to the local proxy object. The proxy object translates the request into the transfer protocol of ORB 512 (e.g., IIOP) and retrieves the nonlocal object reference of the server from reference data 510. The proxy object then sends the translated request to the server specified by the retrieved object reference.

Proxy object 508 will receive the response (or exception) from the server and translates the response to the transfer protocol of the NEO ORB. The proxy object then sends the translated response to the client on the NEO ORB.

Figure 8B:
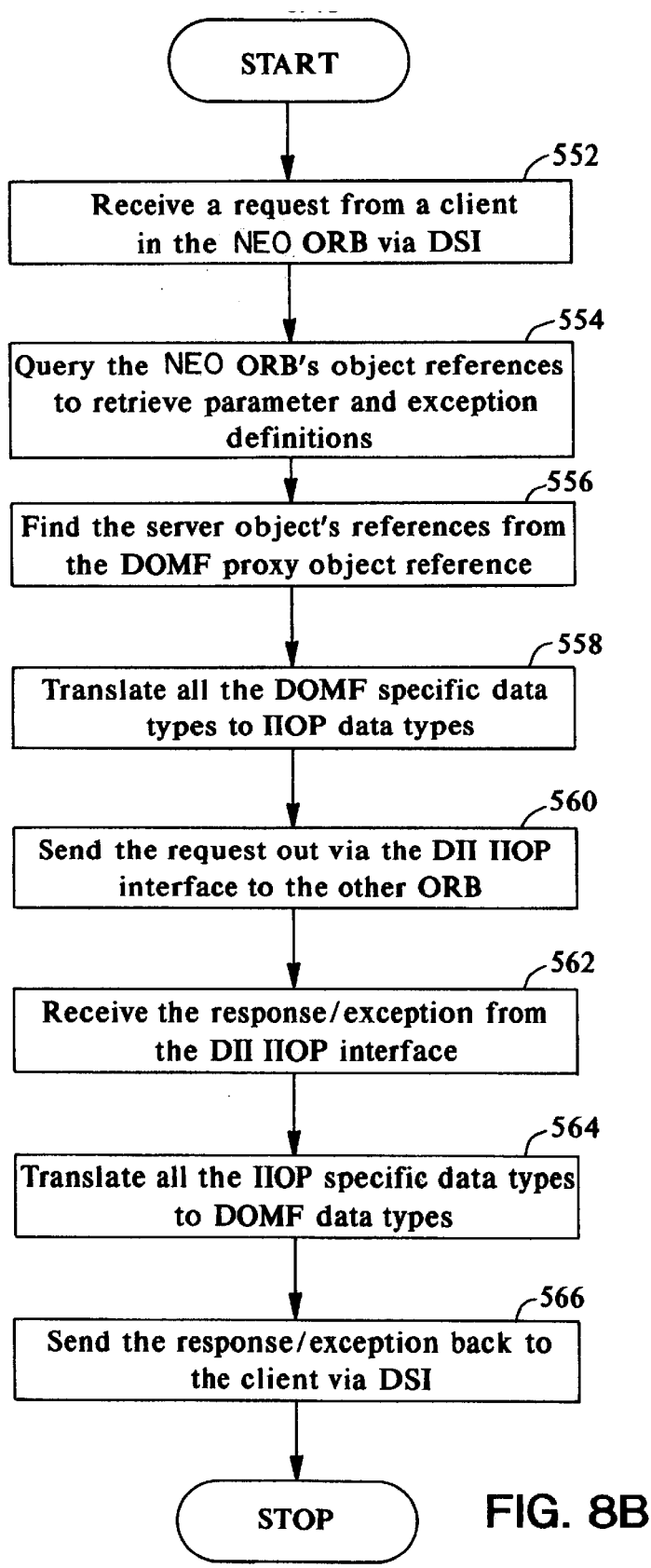
FIG. 8B is a high level flowchart of a process of a NEO client invoking a server on another ORB.

FIG. 8B is a high level flowchart of a process of a NEO client invoking a server on another ORB. At step 552, the NEO ORB receives a request from one of its clients via DSI that specifies a server on another ORB. The bridge queries the NEO ORB's object references to retrieve parameter and exception definitions for the request at step 554. At step 556, the proxy object finds the server object's reference from the DOMF proxy object reference data.

The proxy object translates all the DOMF specific data types to IIOP data types at step 558. Once all the necessary data types are translated, the proxy object sends the request out via the DII IIOP interface to the other ORB at step 560.

At step 562, the proxy object receives the response/exception from the DII IIOP interface from the other ORB. In order to prepare the response for the client, the proxy object translates all the IIOP specific data types to DOMF data types at step 564. Once the response is formatted for the client, the response/exception is sent back to the client via DSI at step 566.

Figure 9A:
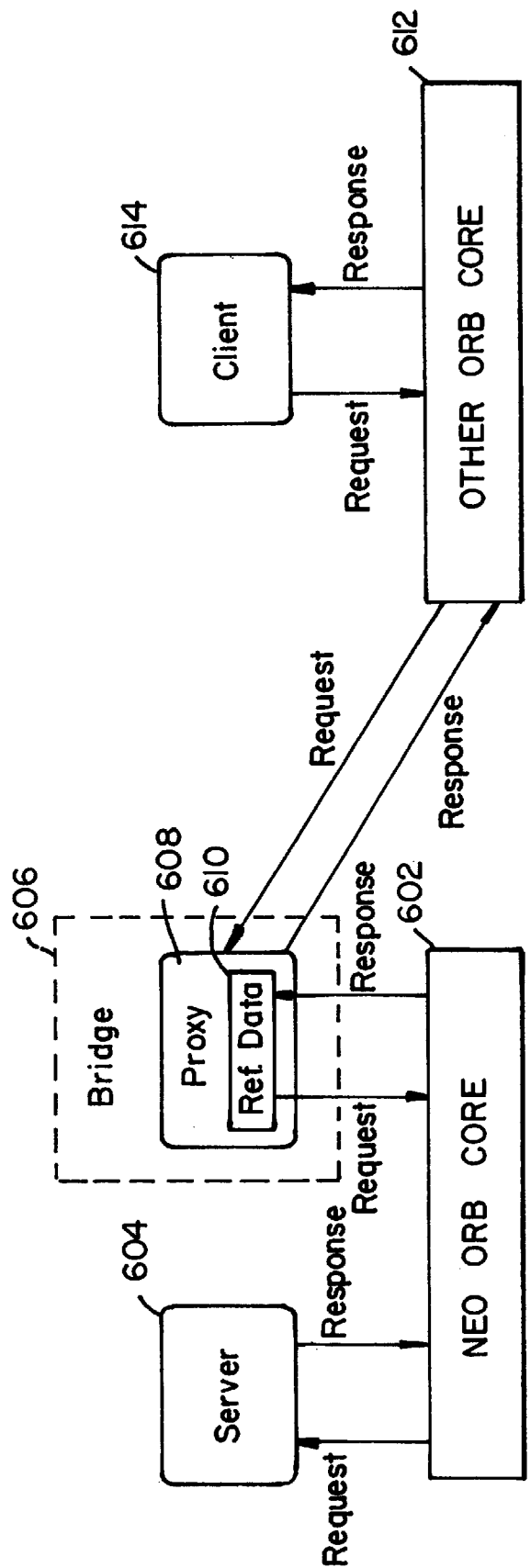
FIG. 9A shows a block diagram of a client object on another ORB invoking a server object on a NEO ORB.

FIG. 9A shows a block diagram of a client on another ORB invoking a server on a NEO ORB. A NEO ORB 602 includes a server 604 and a bridge 606. The bridge includes a proxy object 608 which has a storage space of reference data 610. Another ORB 612 includes a client 614. ORB 614 is a different implementation of NEO ORB 602 as it does not utilize the same transfer protocol.

If the client desires to invoke the server, the client sends a request to the nonlocal proxy object utilizing a local object reference. The proxy object translates the request into the transfer protocol of NEO ORB 602 (e.g., DOMF) and retrieves the local object reference of the server from reference data 610. The proxy object then sends the translated request to the server specified by the retrieved object reference.

Proxy object 608 will receive the response (or exception) from the server and translates the response to the transfer protocol of ORB 612. The proxy object then sends the translated response to the client on ORB 612.

Figure 9B:
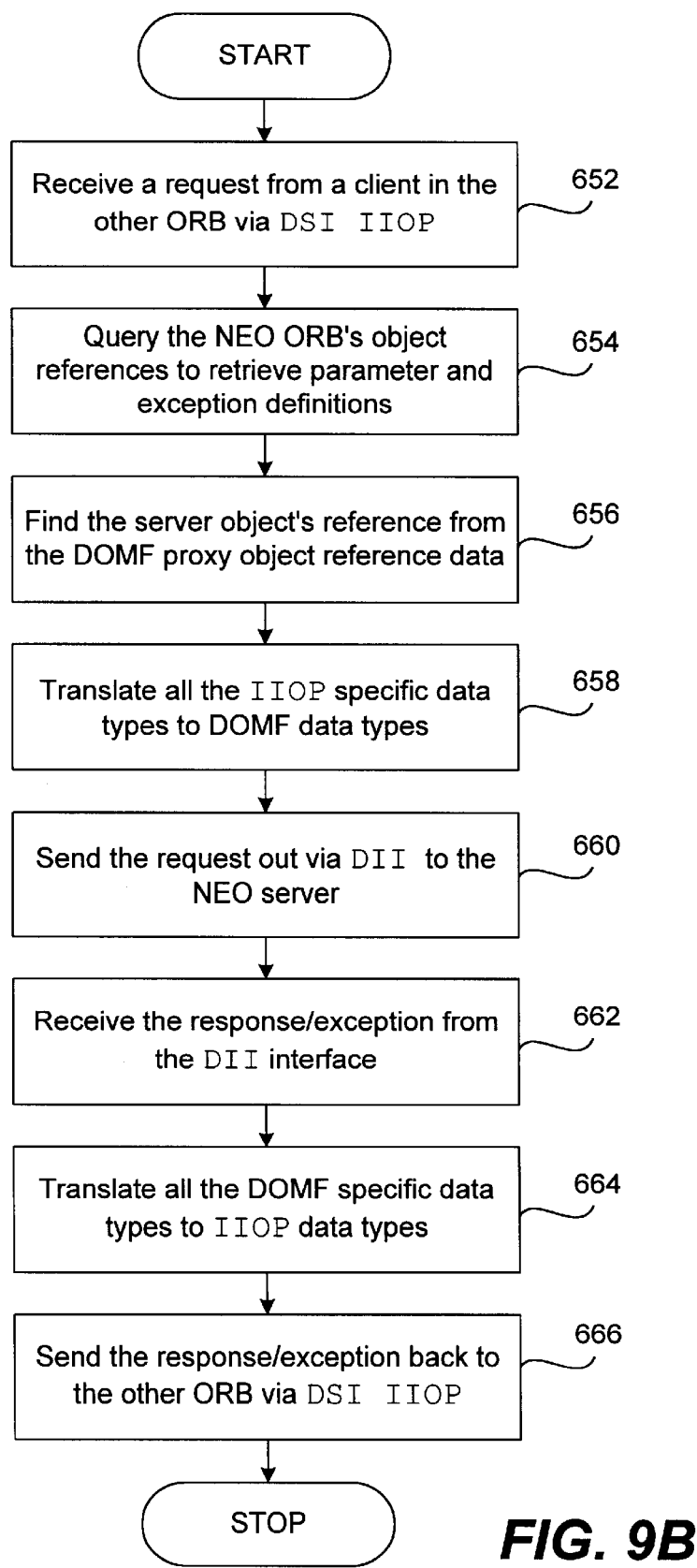
FIG. 9B is a high level flowchart of a process of a client on another ORB invoking a server on a NEO ORB.

FIG. 9B is a high level flowchart of a process of a client on another ORB invoking a server on a NEO ORB. At step 652, the NEO ORB receives a request from a client on the other ORB via DSI IIOP that specifies a server on the NEO ORB. The proxy object queries the NEO ORB's object references to retrieve parameter and exception definitions for the request at step 654. At step 656, the proxy object finds the server object's reference from the DOMF proxy object reference data.

The proxy object translates all the IIOP specific data types to DOMF data types at step 658. Once all the necessary data types are translated, the proxy object sends the request out via DII to the NEO server at step 660.

At step 662, the proxy object receives the response/exception from the DII interface from the server. In order to prepare the response for the client, the proxy object translates all the DOMF specific data types to IIOP data types at step 664. Once the response is formatted for the client, the response/exception is sent back to the client on the other ORB via DSI IIOP at step 666.

While the above is a complete description of preferred embodiments of the invention, various alternatives, modifications and equivalents may be used. It should be evident that the present invention is equally applicable by making appropriate modifications to the embodiments described above. For example, embodiments have been described for providing communication between a NEO ORB and another ORB. However, the invention may be utilized to provide communication between many different implementations of ORBs. Therefore, the above description should not be taken as limiting the scope of the invention which is defined by the metes and bounds of the appended claims along with their full scope of equivalents.

What is claimed is:

1. In a computer system, a method of providing communication between a first object request broker utilizing a first transport protocol and a second object request broker utilizing a second transport protocol different from the first transport protocol, comprising the steps of:

storing within the reference data of a proxy object a reference to a server object;

the proxy object receiving a request in the first transport protocol from a client object on the first object request broker;

the proxy object querying object references of the first object request broker to retrieve parameter and exception definitions for the request;

the proxy object translating the request to the second transport protocol; and the proxy object sending the translated request to the server object specified by the stored reference.

2. The method of claim 1, wherein the translating step includes the step of translating all data types in the request that are specific to the first transport protocol to the second transport protocol.

3. The method of claim 1, further comprising the step of the proxy object receiving a response in the second transport protocol from the server object on the second object request broker.

4. The method of claim 3, further comprising the step of the proxy object translating the response to the first transport protocol.

5. The method of claim 4, further comprising the step of the proxy object sending the translated request to the client object.

6. The method of claim 3, further comprising the step of translating all data types in the response that are specific to the second transport protocol to the first transport protocol.

7. The method of claim 1, wherein the proxy object is in a bridge application.

8. The method of claim 1, wherein the proxy object is located on the first object request broker.

9. The method of claim 1, wherein the first transport protocol is DOMF.

10. The method of claim 1, wherein the second transport protocol is IIOP.

11. A computer program product for providing communication between a first object request broker utilizing a first transport protocol and a second object request broker utilizing a second transport protocol different from the first transport protocol, comprising:

a computer readable storage medium storing a computer program comprising:

code that stores within the reference data of a proxy object a reference to a server object;

code for the proxy object that queries object references of the first object request broker to retrieve parameter and exception definitions for a request in the first transport protocol;

code for the proxy object that translates the request to the second transport protocol; and code for the proxy object that sends the translated request to the server object specified by the stored reference.

12. The computer program product of claim 11, further comprising code that translates all data types in the request that are specific to the first transport protocol to the second transport protocol.

13. The computer program product of claim 11, further comprising code for the proxy object that translates a response in the second transport protocol from the server on the second object request broker to the first transport protocol.

14. The computer program product of claim 13, further comprising code for the proxy object that sends the translated request to the client object.

15. The computer program product of claim 13, further comprising code that translates all data types in the response that are specific to the second transport protocol to the first transport protocol.

16. The computer program product of claim 11, wherein the proxy object is declared in a bridge application.

17. The computer program product of claim 11, wherein the proxy object is on the first object request broker.

18. The computer program product of claim 11, wherein the first transport protocol is DOMF.

19. The computer program product of claim 11, wherein the second transport protocol is IIOP.

20. A system for providing communication between different implementations of object request brokers, comprising:
- a first object request broker utilizing a first transport protocol;
- a client object on the first object request broker;
- a second object request broker utilizing a second transport protocol, the first and second transport protocols being different;
- a server object on the second object request broker; and
- a proxy object that queries object references of the first object request broker to retrieve parameter and exception definitions for a request in the first transport protocol from the client object, translates the request to the second transport protocol and sends the translated request to the server object specified by a reference to the server object stored in the reference data of the proxy object.

21. The system of claim 20, wherein the proxy object translates all data types in the request that are specific to the first transport protocol to the second transport protocol.

22. The system of claim 20, wherein the proxy object translates a response in the second transport protocol from the server on the second object request broker to the first transport protocol.

23. The system of claim 22, wherein the proxy object sends the translated request to the client object.

24. The system of claim 22, wherein the proxy object translates all data types in the response that are specific to the second transport protocol to the first transport protocol.

25. The system of claim 20, further comprising a bridge application that includes the proxy object.

26. The system of claim 20, wherein the proxy object is on the first object request broker.

27. The system of claim 20, wherein the first transport protocol is DOMF.

28. The system of claim 20, wherein the second transport protocol is IIOP.

* * * * *